United States Patent [19]

Irwin

[11] Patent Number: 4,695,945
[45] Date of Patent: Sep. 22, 1987

[54] PROCESSOR I/O AND INTERRUPT FILTERS ALLOWING A CO-PROCESSOR TO RUN SOFTWARE UNKNOWN TO THE MAIN PROCESSOR

[75] Inventor: John W. Irwin, Georgetown, Tex.

[73] Assignee: International Business Machines Corporation, Armonk, N.Y.

[21] Appl. No.: 706,802

[22] Filed: Feb. 28, 1985

[51] Int. Cl.⁴ .............................................. G06F 15/16
[52] U.S. Cl. ................................................... 364/200
[58] Field of Search ... 364/200 MS File, 900 MS File

[56] References Cited

U.S. PATENT DOCUMENTS 4,495,569  1/1985  Kagawa ............................... 364/200
4,591,975  5/1986  Wade et al. ........................... 364/200

Primary Examiner—Archie E. Williams, Jr.
Assistant Examiner—Michael J. Ure
Attorney, Agent, or Firm—Douglas H. Lefeve

[57] ABSTRACT

A co-processor is connectable to a main system data bus to run software unknown to the main processor. The main processor can concurrently run other software and maintains priority over shared I/O facilities by providing trapping logic incorporated in a random access memory and dynamically loadable by the master processor which contains data related to the current useability by the co-processor of a shared I/O device. Additional logic is associated with the co-processor to manage interrupts between the co-processor and the system bus.

20 Claims, 6 Drawing Figures

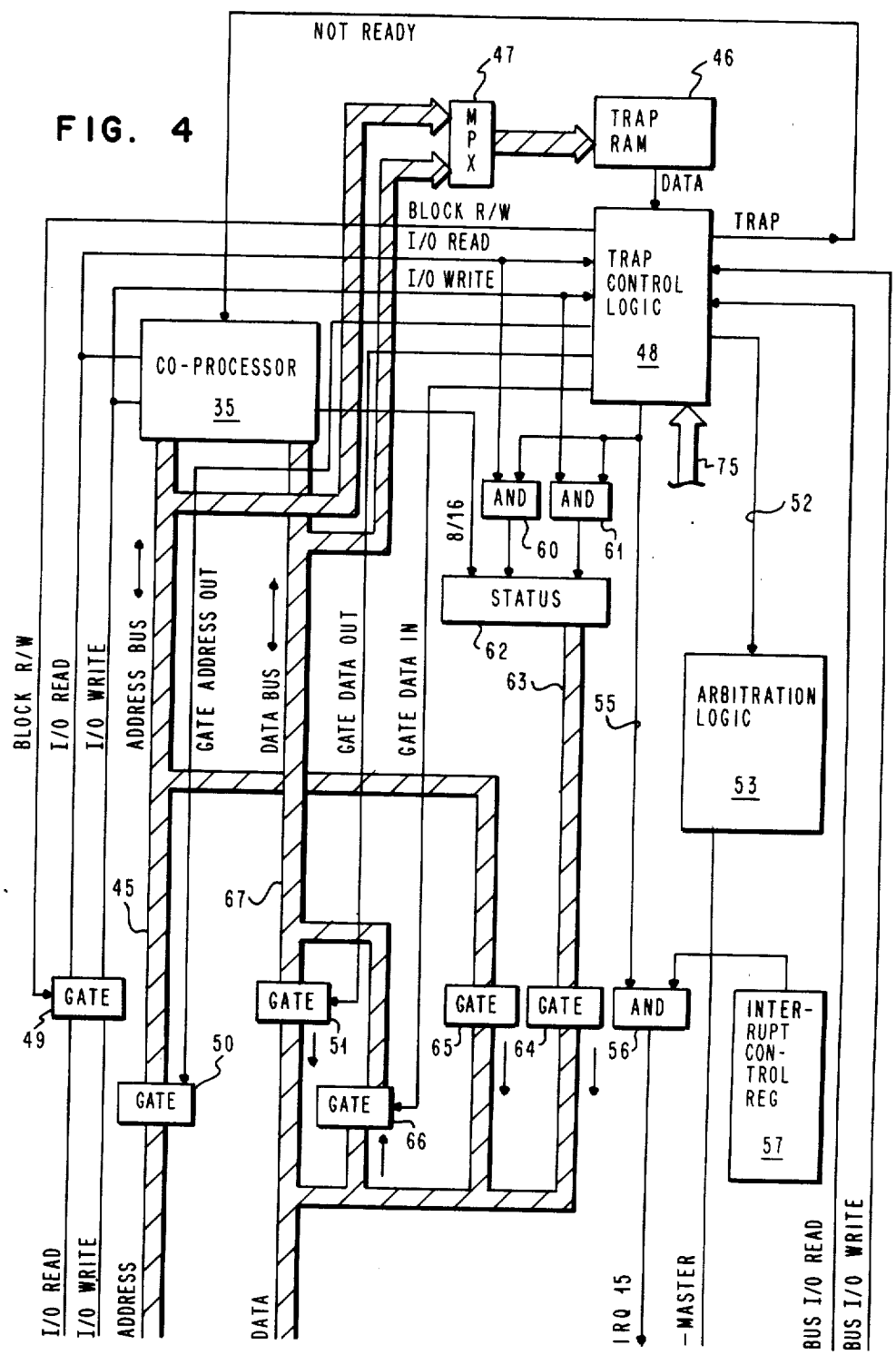

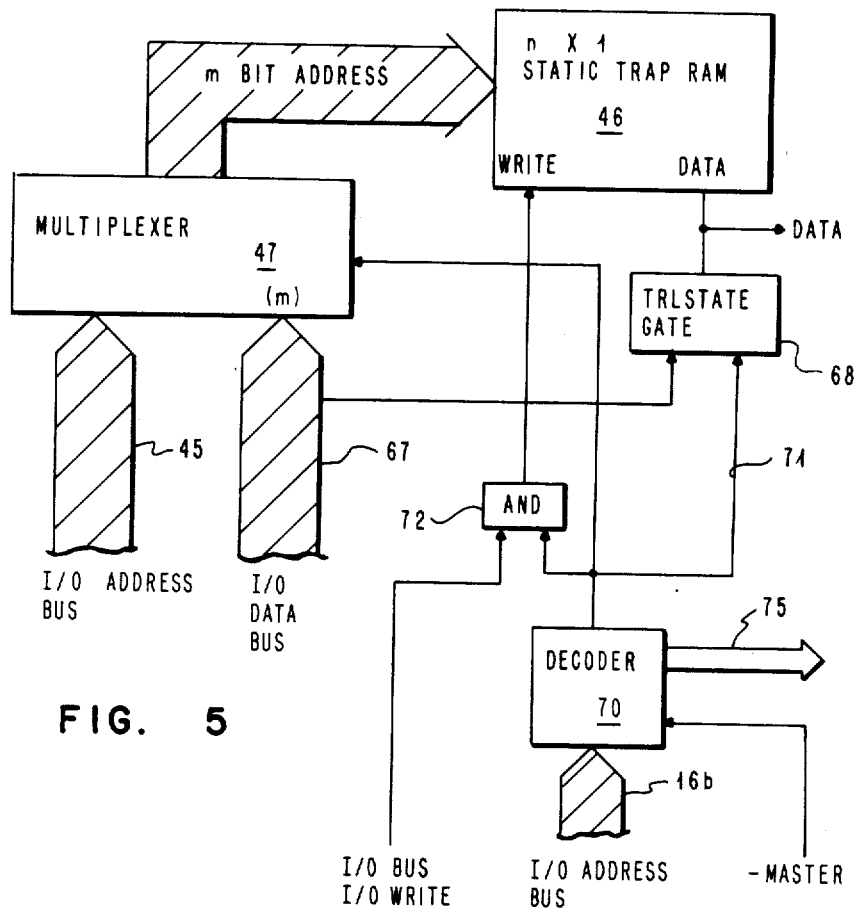

PROCESSOR I/O AND INTERRUPT FILTERS ALLOWING A CO-PROCESSOR TO RUN SOFTWARE UNKNOWN TO THE MAIN PROCESSOR

DESCRIPTION

1. Technical Field

This invention relates generally to the control of processors and more specifically to the control of the utilization of system resources by a second processor connected to concurrently run a program different from that being executed by a main processor in the system.

2. Background Art

The ready availability of micro-processors has lead to a dramatic increase in the number of various characterizations of relatively small computers including those known as personal computers. However, an average so-called "personal computer" of even half a decade ago might be considered a very primitive device in comparison with an average state of the art "personal computer".

Many individuals and business concerns have purchased personal computer systems and have either written or purchased computer program software for properly instructing the computer to perform selected tasks such as word processing and data processing applications.

As this personal computer technology has evolved so rapidly, there has been a strong need to maintain some degree of compatibility in the system components. Thus, standards, either official or de facto, have evolved which, in most cases, allow many hardware input/output (I/O) devices to be used in state of the art systems, although the devices may have been purchased several years ago for use in systems that are considered primitive by today's standards.

The program software, as well as the extensive data files that are usually created as a result of using the software, however, have presented a perplexing compatibility problem as the hardware technology has evolved. As an example, most of the early personal computers were eight bit machines, in that the processor was capable of processing a single eight bit byte at a time. The technology later evolved into the use of sixteen bit processors and is more recently evolving into thirty-two bit processors. Although software originally written for an eight bit processor might be useable or made to be useable with a thirty-two bit processor system, the application could usually be programmed to run in a much more efficient and high performance manner by writing the software with an original intent of running on a thirty-two bit processor. Of course, the obvious problem with that approach is that of the extensive software and data bases already paid for which are designed for the eight and sixteen bit processors.

Accordingly, the desirability of being able to use existing software and data files associated therewith with more modern and higher performance computer systems is obvious. Additionally, however, the newer and higher performance computer equipment must be utilized in a manner to take advantage of its greater capability. That is, the additional expense of the newer and higher performance equipment cannot be justified if its performance must be under-utilized by the older, lower power software. Thus, although additional processors, sometimes called co-processors, have been utilized in the prior art to allow particular new functions of the computer (such as numeric or floating point decimal capabilities) typical prior art co-processor arrangements have relegated the previously existing processor to that of a special purpose controller (such as an I/O controller) while the new, additional co-processor adds the additional functional capability.

In contrast with the above-described prior art use of co-processors, it has been proposed to use an additional, less advanced processor (in comparison with the main processor of a state of the art system) to allow the continued utilization of existing, lower power or lower performance programs and existing data files associated therewith in the latest, most high performance computer systems. In this type of configuration the main processor is capable of executing high performance programs independently of the co-processor. The co-processor configuration is such that existing, earlier generation programs and the data files associated therewith may be run substantially concurrently with the programs being executed by the main processor.

In the configuration just described, however, problems of contention for system resources can arise between the two processors. These problems are compounded by the fact that entirely different operating systems may be in effect relative to the system environments as viewed by each of the processors. Therefore, although it would be of great advantage to allow concurrent operation of a co-processor to run application programs with a first type of operating system while a main processor runs other programs with a different operating system, it would be highly desirable to provide a control technique to solve the contention problems related to utilization of the same I/O devices by the two processors as well as the handling of interrupts in the system by the two processors.

DISCLOSURE OF THE INVENTION

Accordingly, a control technique is employed in a co-processing environment in which I/O facilities are shared between a master processor running a known set of support code and a co-processor running code of unknown origin relative to the master processor. The actual management of the shared I/O resources is made transparent to the software running in the co-processor because of additional control logic associated with the co-processor. This is accomplished by providing trapping logic incorporating a random access memory, loadable by the master processor, which contains data related to the current useability by the co-processor of a shared I/O device. The trapping logic is dynamically controllable by the main processor depending on the main processor's current needs for utilization of the various shared I/O devices. Logic is also included for utilizing the main processor to perform access to the I/O devices for the co-processor such that the co-processor's needs for access to the I/O devices are effectively served when direct access is prevented. Where an I/O device that was in use when the co-processor program was written is not present in the system or has been superseded by an improved I/O device, the main processor may emulate the original I/O device.

Additionally, logic is associated with the co-processor to manage interrupts to and from the co-processor card so as to prevent interference with the main processor's utilization of system components.

BRIEF DESCRIPTION OF DRAWINGS

FIG. 4 is a detailed logic diagram of the I/O filter shown in FIG. 2.

FIG. 5 is a diagram which depicts the set-up by the master processor of the I/O filter.

FIG. 6 is a diagram which depicts the register contents for the logic shown in FIGS. 3–5.

BEST MODE FOR CARRYING OUT THE INVENTION

Figure 1:
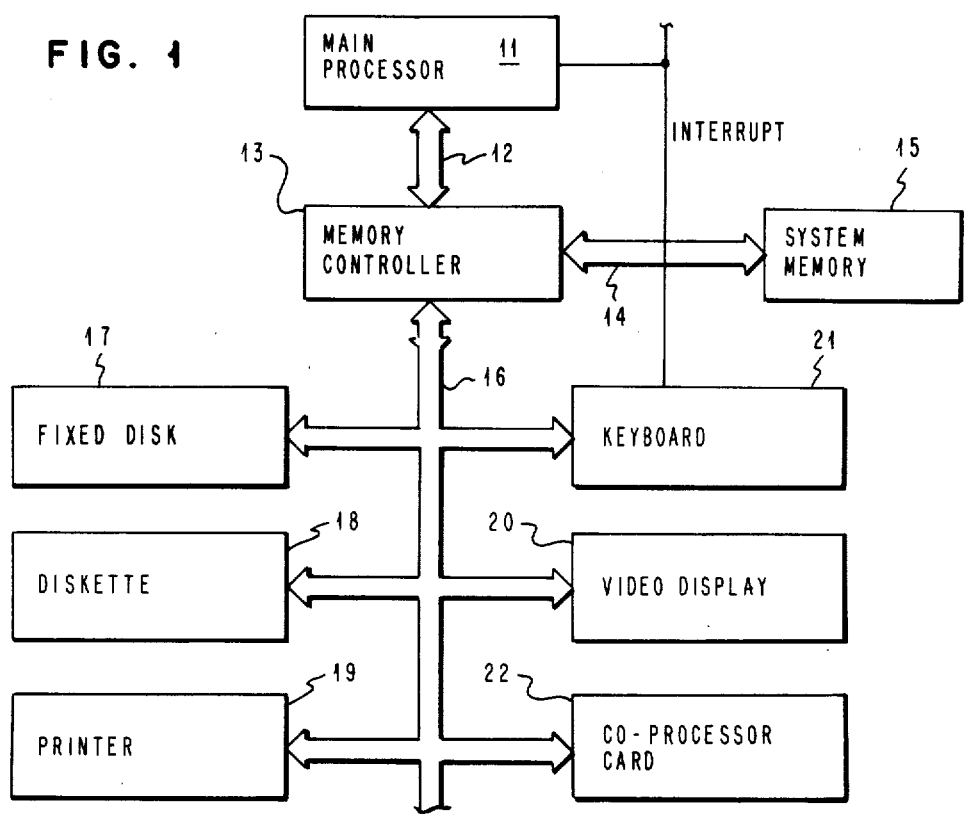
FIG. 1. is a block diagram of the system configuration of a computer system architecture employing both a main processor and a co-processor managed according to the techniques of this invention.

In FIG. 1 a block diagram of the system configuration of a computer system architecture employing both a main processor and a co-processor is shown. A main processor 11 is connected by a channel 12 to a memory controller 13. The main processor 11 may be, for example, a Motorola 68000 or Intel 80286 micro-processor, although it will be understood by those skilled in the art that the main processor 11 may be virtually any general purpose processor of any size or speed, as this invention is by no means confined to a micro-processor environment. The memory controller 13, may be, for example, an Intel 8202, particularly if the main processor is an Intel 80286 micro-processor. A channel 14 connects the memory controller 13 to a system memory 15, which is typically a random access memory.

An I/O bus 16 connects the controller 13 to a plurality of I/O devices including a fixed disk, or hard file 17, a floppy diskette drive 18, a printer 19, a video display 20, and a keyboard 21. In addition to the aforementioned I/O devices 17–21, a co-processor card 22 is also attached to the I/O bus 16. With the exception of the keyboard, each of the I/O devices 17–21 is attached to an interrupt line within the I/O bus 16. The keyboard interrupt is conveyed directly to the main processor 11 and does not appear on I/O bus 16.

Figure 2:
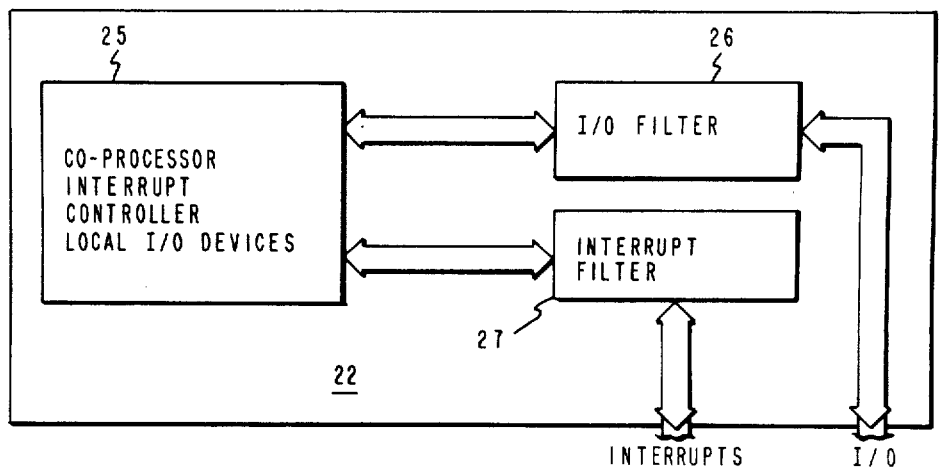
FIG. 2, is a block diagram of the co-processor portion of the system of FIG. 1.

For a functional block diagram of the contents of the co-processor card 22, reference is made to FIG. 2. The nucleus 25 of the co-processor card includes the processor itself, which may, for example, be an Intel 80286 micro-processor, an interrupt controller which may be, for example, an Intel 8259, and one or more local I/O devices which may, for example, include a timer from which a time of day clock and sound generation facilities receive their timing signals. Additionally, an I/O filter 26, which is controllable by the main processor 11, is utilized to prevent access of the co-processor card 22 to the other I/O devices 17–21 which are connected to the I/O bus 16 in the event that the main processor 11 has a higher priority need for those devices. In a similar sense, an interrupt filter 27 is utilized in the control of interrupts associated with the co-processor. The interrupt filter 27 can selectively block interrupt lines from the I/O bus 16 to prevent their response by the co-processor. The logic of the interrupt filter 27 can also allow the main processor 11 to generate interrupts through I/O writes to the co-processor card 22. By this means, the co-processor can be allowed to directly process any interrupt, or the main processor 21 can require itself to process the interrupt and regenerate an interrupt to the co-processor. Thus, the main processor 11 is able to simulate any I/O device.

Figure 3:
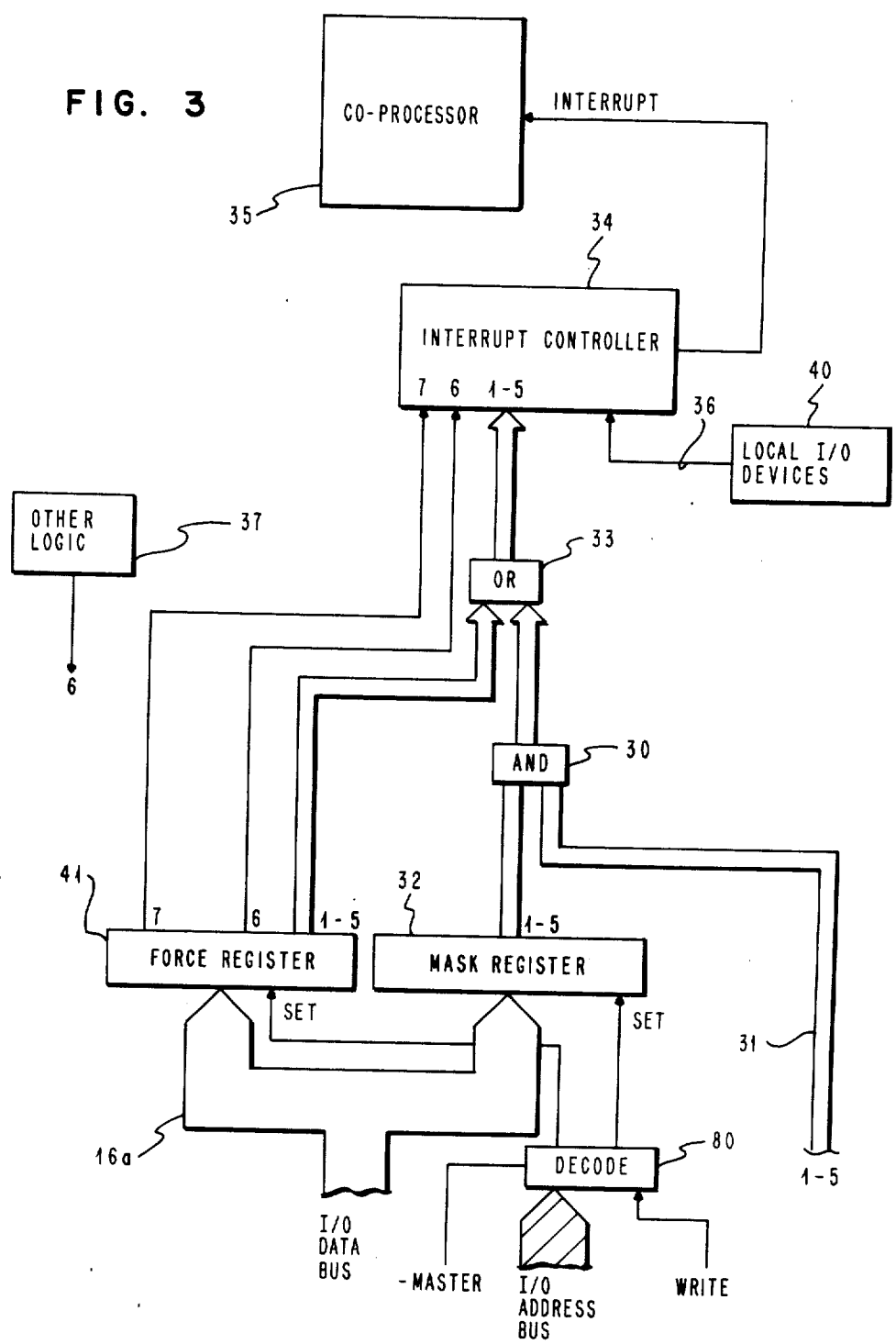
FIG. 3 is a detailed logic diagram of the interrupt filter shown in FIG. 2.

Referring now to FIG. 3, a logic diagram of the interrupt filter 27 of the co-processor card 22 is shown. Throughout the remainder of this description it will also be helpful to refer to FIG. 6 for a depiction of the contents of the various registers and memory which will be described hereinafter. Four types of interrupt situations that may be associated with the co-processor card 22 will be described. The first, and perhaps most common, type of interrupt to be considered arrives at a set of AND gates 30 via a set of bus interrupt lines 31. For the purposes of this description, consider that the levels of interrupts that can be conveyed along the bus interrupt lines 31 to the AND gates 30 are the bus interrupts 1–5. Assuming that one of the interrupts 1–5 is present at the appropriate one of AND gates 30, if this one of AND gates 30 is properly conditioned by the mask register 32 (as is explained below) the interrupt is gated through AND gates 30, then through OR gates 33, to the interrupt controller 34, and finally to the interrupt line of the co-processor 35. As stated above, if the co-processor 35 is an Intel 80286, the interrupt controller 34 may be an Intel 8259.

In order for the plurality of AND gates 30 to be properly conditioned to pass interrupts therethrough, the mask register 32 must be previously loaded by the main processor 11 via the I/O portion 16a of the data bus 16. To allow the AND gates 30 to be properly (and individually) conditioned relative to each of the possible bus interrupts 1–5, a separate bit in the mask register 32 associated with each of the bus interrupts 1–5 is set if the main processor 11 desires the co-processor 35 to respond directly to one of the bus interrupts 1–5. Thus, if the main processor 11 is utilizing resources such that it cannot permit the co-processor 35 to directly respond to one of the bus interrupts 1–5, the main processor 11 can dynamically turn off the bit in the mask register 32 associated with the particular interrupt that the main processor 11 desires to prohibit response by the co-processor 35. As an example of this, assume that the bus interrupt level 3 is associated with the fixed disk 17. Assume further that the co-processor 35 has recently been engaged in reads and/or writes with the fixed disk 17. If the main processor 11 develops a need for access to the fixed disk 17, processor 11 can reset the bit in the mask register 32 associated with the interrupt level 3 from a one to a zero which will serve to decondition the one of the plurality of AND gates 30 associated with the interrupt level 3.

Another type of interrupt associated with the co-processor card 22 is the outbound interrupt, which is distinct from the inbound interrupt. In this case, other logic 37 on the co-processor card 22 has a need to issue an interrupt to the main processor 11. Such an interrupt is designated in FIG. 3 as interrupt level 6. Since this interrupt is not on lines 31, it is not conveyed to AND gates 30. This situation is as it should be, since the interrupt was intended for the main processor and not for the co-processor 35.

A third type of interrupt associated with the co-processor card 22 is an interrupt intended for the co-processor 35 which originates on the co-processor card 22 from one of the local I/O devices on that card which are depicted by block 40. As described above, one such I/O device may be, for example, a timer to periodically issue a signal from which a time of day clock is updated. In this case, the interrupt from the local I/O devices 40 is conveyed directly along line 36 to the level 0 interrupt input of the interrupt controller 34 to be conveyed to the interrupt input of the co-processor 35.

A fourth type of interrupt processed by this logic on the co-processor card 22 is a simulated interrupt from the co-processor 35 by the main processor 11. Instead of entering the co-processor card 22 along lines 31, this simulated interrupt from the main processor 11 enters the co-processor along the I/O data bus portion 16a of the data bus 16. Such an interrupt signal on the I/O data bus 16a causes a force register 41 to directly convey an interrupt signal, such as any of the interrupt levels 1 through 7, to the interrupt controller 34. It will be noted in this description that the level 7 interrupt is not one of the interrupt levels that is ever found on interrupt lines 31. Thus, the level 7 interrupt can only be forced from register 41 in response to an appropriate set of signals on the I/O data bus portion 16a of the I/O bus 16. This facility allows the master processor to provide interrupts for devices such as the keyboard that have no assigned interrupt line in the I/O bus 16. The interrupt level 6, however, can also be forced in this manner, even though the level 6 interrupt can also be conveyed outbound from the co-processor card 22 via lines 31. Accordingly, it will be understood that the level 6 interrupt can be sent outbound from co-processor card 32 on lines 31 and can also be simulated by the force register 41 to be conveyed to the interrupt controller 34 for the co-processor 35. This facility allows a single interrupt level to be used as a two way communication path between the main processor 11 and the co-processor 35.

Reference is now made to FIG. 4 for a description of the logic whereby the co-processor 35 can be denied direct access to devices on the I/O bus 16 depending on the current utilization of these I/O devices by the main processor 11. As an example, consider the situation in which the co-processor 35 desires to read data from the fixed disk 17. The co-processor 35 posts the address of the fixed disk 17 on the co-processor address bus 45. This address is also made available to the trap RAM 46 through a multiplexer 47. Assuming that the main processor 11 is currently utilizing the fixed disk 17, when the address of the fixed disk 17 is conveyed to the trap RAM 46, a zero data bit is output from the address in the trap RAM 46 corresponding to the address of the fixed disk 17. This zero data bit is conveyed along the data line to the trap control logic 48. At this point, the trap control logic 48 raises the BLOCK R/W (block read/write) signal to a set of gates 49 in series with the I/O READ and I/O WRITE lines from the co-processor 35. This serves to block read and write signals from leaving the co-processor card 22 from the co-processor 35.

Since the co-processor 35 is attempting to read data from an I/O device, the co-processor 35 raises its I/O READ line. Since the I/O READ and I/O WRITE lines are also input to the trap control logic 48, this I/O READ signal in conjunction with the zero bit from the trap RAM 46 causes the trap control logic 48 to begin a read trap sequence. The trap control logic 48 immediately issues a TRAP signal on the NOT READY line to the co-processor 35 to stop the co-processor 35 in midcycle. At this time, the trap control logic 48 also disenables gate 50 to the I/O address bus portion 16b and disenables gates 51 to the data portion 16a of the I/O bus 16. With these actions, the co-processor 35 has now been fully disconnected from the I/O bus 16.

Next, a signal on line 52 to the bus arbitration logic 53 results in the dropping of the -MASTER LINE. This relinquishes any control of the I/O bus 16 by the co-processor card 22.

The trap control logic 48 also generates a signal on line 55 which is input to an AND gate 56. The other input to the AND gate 56 is from an interrupt control register 57. If the main processor 11 has previously set the interrupt control register to allow an interrupt on an I/O trap sequence, an IRQ 15 (level 15 interrupt) signal is output from the AND gate 56. Next, the main processor 11 detects the requirement for service by means of either the IRQ 15 signal or, in other instances, by polling the co-processor status register 62.

The signal provided on line 55 by the trap control logic 48 is also an input to a pair of AND gates 60 and 61. The other inputs to gates 60 and 61 are the I/O READ and I/O WRITE lines, respectively, from the co-processor 35. Thus, when the signal appears on line 55 either AND gate 60 or AND gate 61 sets a bit in a status register 62. A signal indicative of the requirement for either an 8 bit data bus or a 16 bit data bus, available at the output of the co-processor 35, is also input to the status register 62. Thus, when the main processor 11 detects the requirement for service processor 11 reads the status register 62 which contents are gated from lines 63 through gate 64 and onto the I/O data bus portion 16a of the data bus 16.

The main processor 11 now knows that the co-processor 35 has attempted to read data from an I/O device on either an 8 bit wide or a 16 bit wide data channel. The main processor now issues a read from the co-processor trap address register. When this read is detected by the decoder 70, a select line in a selection bus 75 is raised to enable control logic 48 to open gates 65 to pass the address from the co-processor address bus 45 onto the I/O data bus portion 16a of the I/O bus 16. The main processor 11 now has the address from which the co-processor 35 attempted to read. The main processor 11 can now either issue the read requests directly to the I/O device or calculate what the read data should be. However the main processor 11 derives the read data, it writes that data onto the I/O data bus portion 16a, through a set of gates 66 and, therefore, onto the co-processor data bus 67 to the co-processor 35. Similarly to writing the trap address to the I/O address bus portion 16b, the operation of writing the read data to the co-processor data bus 67 involves the opening of a set of gates (66) to allow the data onto the bus.

Since the read data has now been written to the co-processor 35, the trap control logic 48 drops the NOT READY signal to the co-processor 35 to allow the co-processor 35 to proceed. The co-processor 35 then receives the data that is being held on the data bus 67 and proceeds with the operation as if the actual I/O device had been read.

The sequence is very similar for a trapped write operation. In that case, the main processor 11 simply obtains the trap address as in a read trap, then issues a read to the trap data register. When this read is detected by decoder 70, a select line in selection bus 75 is raised to enable control logic 48 to open gates 51 to pass the data from the co-processor data bus 67 onto the I/O data bus 16a. The main processor 11 can then write the data to the I/O device if desired. Rather than writing this data to an I/O device, this procedure can be followed when it is desired to send data from the co-processor 35 to the main processor 11 for use by the main processor 11 for some other purpose.

Since there is no requirement to write to a real I/O device, read or write traps provide a convenient method of synchronizing the operation of the two processors (commonly known as a semaphore) or of passing data between the co-processor 35 and the main processor 11 during the running of diagnostics or for passing parameters or parameter addresses from the co-processor 35 input/output operating system to service routines running in the main processor 11.

Referring now to FIG. 5, the logic is shown for loading the trap RAM 46 by the main processor 11. The trap RAM 46 may be an n by 1 bit static random access memory. As described relative to FIG. 4, when the trap RAM 46 is addressed, the binary status of the single bit residing at the particular address tells the trap control logic 48 whether or not the co-processor 35 can directly address an I/O device on the I/O bus 16. For the purposes of this explanation, it is assumed that a binary zero at the chosen address means that the co-processor 35 *cannot* directly access the chosen I/O device on the I/O bus 16, while a binary value of 1 means that the trap control logic is not invoked and the co-processor 31 can have direct access to the particular device on the I/O bus 16 corresponding to the address in the trap RAM 46. One of the particularly useful and important features of this invention is that the main processor 11 can dynamically change the status of the particular bits in the trap RAM 46.

Referring again to FIG. 5, when the main processor 11 has control of the I/O bus 16, the -MASTER line is at an up level. If the main processor then places a particular "trap RAM update" address on the I/O address portion 16b of the I/O bus 16, a decoder 70 detects that the main processor 11 desires to update the status of one of the bits in the trap RAM 46. An output of the decoder 70 on line 71 switches the multiplexer 47 from the default state (which was described in FIG. 4, wherein the co-processor address bus 45 contents are gated through multiplexer 47 to the trap RAM 46) to a temporary state in which data on the I/O data bus portion 16a and the co-processor data bus 67 is passed through the multiplexer 47 to address the trap RAM 46. (This also requires enabling of the gates 66, FIG. 4.) With the multiplexer so switched, the I/O portion 16a of bus 16 as well as the co-processor data bus 67 has now applied thereto by the main processor 11 a plurality of at least m+1 bits. The m bits are gated through the multiplexer 47 to address a particular single bit memory location in the trap RAM 46 while the additional bit is gated from the data bus 67 through gate 68 to the data terminal of the trap RAM 46. Concurrent with this the main processor 11 also causes the I/O bus 16 I/O write line to rise to an up level. With the signal on line 71 from decoder 70 also at an up level, the AND gate 72 provides an up level output to the WRITE terminal of the trap RAM 46. In this manner, the main processor 11 can write either a zero or a 1 bit to a particular address in the trap RAM 46 which corresponds to a particular I/O device.

Referring back to FIG. 3, in a similar manner decoder 80 is used to set particular bits to binary zero or one levels in the force register 41 and in the mask register 32 in a manner analogous to that described just above for setting the bits in the trap RAM 46. It will, therefore, be understood by those skilled in the art that the dynamic flexiblity offered by this technique relative to I/O traps is also offered relative to interrupt controls.

Table 1 of the following programming design language is another form of the description of the above-described operations for performing a trapped READ operation. This listing parallels the operation described above relative to FIG. 4.

TABLE 1

READ_TRAP:
Trap_address = TRAP ADDRESS REGISTER ! get the trap address
Compare Trap_address with Trap_table (table of trap addresses)
If Trap_access is a semiphore address
Then Do;
Execute whatever action semiphore indicates
Trap_data = calculated semiphore response
End Do;
ElseIf Trap_address is shared device
Then Do;
If Device can be assigned to co-processor
Then Do;
Trap_RAM = Assign device to co-processor
Read_data = Read I/O device port
End Do;
Else (device cannot be reassigned)_
Notify user of conflicting demands and exit
ElseIf Trap_address is an emulated device
Then Do;
Read some actual I/O device if necessary
Calculate emulated read response
Read_data = calculated emulated read response
End Do;
ELse
Trap should not have occurred. Notify user and exit
Endif;
Endif;
Endif;
If 16-bit_flag = False
Then Do;
Exchange high and low bytes of Read_data as
address requires so that co-processor receives
data on correct bus lines.
End Do;
TRAP DATA REGISTER = Trap_data; ! send the data to co-processor
End READ_TRAP;

Table 2 of the following programming design language is another form of the description of the above-described operations for performing a trapped WRITE operation. This listing parallels the operation described above relative to FIG. 4.

TABLE 2

WRITE_TRAP:
Trap_address = TRAP ADDRESS REGISTER ! get the trap address
Compare Trap_address with Trap-Table (table of trap addresses)
If Trap_address is a semiphore address
Then Do;
Write_data = Read TRAP DATA REGISTER
If 16-bit_data = False
Then
Exchange high and low data bytes of
Write_data if address requires to that
correct byte is processed.
Execute whatever action semiphore indicates using
Write_data as a parameter
End Do;
ElseIf Trap_address is shared device
Then Do;
If Device can be assigned to co-processor
Then Do;
Trap_RAM = Assign device to co-processor
Write_data = TRAP DATA REGISTER
If 16-bit_data = False
Then

TABLE 2-continued

```
Exchange high and low data bytes of
Write__data as address requires so
that correct byte is processed.
Write I/O device port = Write__data
End Do;
Else (device cannot be reassigned)
Notify user of conflicting demands and exit
ElseIf Trap__address is an emulated device
Then Do;
Write__data = TRAP DATA REGISTER
If 16-bit__data = False
Then
Exchange high and low data bytes of
Write__data if address requires so that
correct byte is processed.
Calculate proper emulation action
Write some actual I/O device if necessary, either
with Write__data or with calculated data
End Do;
Else
Trap should not have occurred. Notify user and exit
Endif;
Endif;
Endif;
End WRITE__TRAP
```

Table 3 of the following programming design language is another form of the description of the above-described operations for setting the availability of I/O devices in the trap RAM, for use by the co-processor 35. This listing parallels the operation described above relative to FIG. 5.

TABLE 3

```
INITIALIZE:
Stop co-processor;
Write Trap Ram from stored table of assignments. User may be
given menu option to assign devices such as printer to
main processor or co-processor as required. If user makes
choices, modify table of assignments to reflect current
assignment.
INTERRUPT CONTROL REGISTER = other contents +
INTERRUPT ON I/O
! Enable co-processor interrupt
on I/O trap
Start co-processor;
End INITIALIZE;
```

Table 4 of the following program design language is another form of the description of the service loop program running in the main processor. When this routine detects the need for service, the routines in Table 1 and 2 are called as necessary.

TABLE 4

```
SERVICE__LOOP:
Begin; ! repeat loop indefinitely
Wait for interrupt 15;
Flags = STATUS REGISTER; ! read the flags register
If (Flags & 16-bit I/O bit) < > 0
Then 16-bit__flag = True;
Else 16-bit__flag = False;
If (Flags & READ I/O bit) < > 0
Then READ__TRAP;
Else If (Flags & WRITE I/O bit) < > 0
Then WRITE__TRAP;
Else
Some other trap not part of this disclosure;
Endif;
End SERVICE__LOOP; ! repeat from begin
```

In summary, a control technique is described for a main processor/co-processor environment in which I/O facilities are shared between a master processor and a co-processor. The actual management of the shared I/O resources is made transparent to the co-processor by providing trapping logic incorporated in a random access memory, loadable by the master processor, which contains data related to the current useability by the co-processor of any of the shared I/O devices. Logic is also associated with the co-processor to manage interrupts to and from the co-processor card.

While the invention has been shown and described with reference to particular embodiments thereof, it will be understood by those skilled in the art that the foregoing and other changes in form and details may be made therein without departing from the spirit and scope of the invention. For example, while the system described herein has used as examples, specified microprocessors and controllers, it will be understood by those skilled in the art that the principles of this invention can be applied in systems employing processors of any size, large or small, fast or slow, the examples of hardware having been used herein only for the purposes of description, and not by way of limitation.

I claim:

1. In a data processing system including a main processor and at least one input/output device connected to a bus, the improvement for configuring said system to allow the addition of a co-processor to operate concurrently with said main processor and selectively sharing utilization of said input/output device, comprising:
    means dynamically controlled by said main processor for selectively preventing direct access to said input/output device in response to an attempted access by said co-processor;
    means connected to said means for selectively preventing for utilizing said main processor to service said attempted access of said input/output device by said co-processor when said means for selectively preventing has been enabled to prevent direct access to said input/output device by said co-processor; and
    said means for selectively preventing and said main processor allowing concurrent utilization of said input/output device by said main processor and co-processor when said means for selectively preventing has not been enabled.

2. The data processing system of claim 1 wherein said input/output device further comprises a real or emulated input/output device.

3. The data processing system of claim 2 wherein said means for selectively preventing further comprises means for disconnecting said co-processor from said bus.

4. The data processing system of claim 3 wherein said means for utilizing further comprises means for saving an address of said input/output device.

5. The data processing system of claim 4 wherein said means for utilizing further comprises means for issuing an interrupt signal to said main processor.

6. The data processing system of claim 5 wherein said means for utilizing further comprises means for causing said main processor to access said input/output device corresponding to said saved address and read data from said input/output device.

7. The data processing system of claim 6 wherein said means for utilizing further comprises means for causing said co-processor to be temporarily reconnected to a portion of said bus and means for causing said main processor to communicate said data read from said input/output device to said co-processor.

8. The data processing system of claim 7 wherein said portion of said bus is a data portion of said bus.

9. The data processing system of claim 6 wherein said means for utilizing further comprises means for causing said main processor to access said input/output device corresponding to said saved address and write data to said input/output device.

10. The data processing system of claim 9 wherein said means for utilizing further comprises means for causing said co-processor to be temporarily reconnected to a portion of said bus and means for causing said co-processor to communicate said data to be written from said co-processor to said main processor.

11. The data processing system of claim 10 wherein said portion of said bus is a data portion of said bus.

12. The data processing system of claim 1 further comprising means controllable by said main processor for selectively creating a simulated interrupt from data on a data portion of said bus and for causing this created interrupt to be sent to said co-processor.

13. In a data processing system including a main processor and at least one input/output device connected to a bus, the method for configuring said system to allow the addition of a co-processor capable of operation concurrent with that of said main processor and selectively sharing utilization of said input/output device, comprising:
   selectively preventing direct access to said input/output device by said co-processor;
   utilizing said main processor to service an attempted access of said input/output device by said co-processor when said direct access to said input/output device by said co-processor has been selectively prevented; and
   allowing concurrent utilization of said input/output device by said main processor and co-processor when said direct access to said input/output device is not being selectively prevented.

14. The method of claim 13 wherein said step of selectively preventing further comprises utilizing said main processor dynamically to selectively prevent access by said co-processor to said input/output device.

15. The method of claim 14 wherein said step of selectively preventing further comprises disconnecting said co-processor from said bus.

16. The method of claim 15 wherein said step of utilizing further comprises saving an address of said input/output device.

17. The method of claim 16 wherein said step of utilizing further comprises issuing an interrupt signal to said main processor.

18. The method of claim 17 wherein said step of utilizing further comprises causing said main processor to access said input/output device corresponding to said saved address and read data from said input/output device.

19. The method of claim 17 wherein said step of utilizing further comprises causing said main processor to access said input/output device corresponding to said saved address and write data to said input/output device.

20. The method of claim 13 further comprising utilizing said main processor dynamically to selectively create a simulated interrupt from data on a data portion of said bus and cause this created interrupt to be sent to said co-processor.

* * * * *